(12) United States Patent
Tsai et al.

(10) Patent No.: US 10,523,408 B2
(45) Date of Patent: Dec. 31, 2019

(54) COMMUNICATION SYSTEM AND SYNCHORONIZATION METHOD THEREOF (71) Applicant: HTC Corporation, Taoyuan (TW)

(72) Inventors: Tsung-Yu Tsai, Taoyuan (TW); Yan-Min Kuo, Taoyuan (TW); Li-Yen Lin, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 16/203,637

(22) Filed: Nov. 29, 2018

(65) Prior Publication Data

US 2019/0165924 A1 May 30, 2019

Related U.S. Application Data (60) Provisional application No. 62/592,377, filed on Nov. 29, 2017.

(51) Int. Cl.
H04L 7/00 (2006.01)
H04W 56/00 (2009.01)
H04J 3/06 (2006.01)

(52) U.S. Cl.
CPC .......... *H04L 7/0012* (2013.01); *H04J 3/0638* (2013.01); *H04W 56/002* (2013.01); *H04W 56/005* (2013.01); *H04W 56/009* (2013.01)

(58) Field of Classification Search
CPC . H03D 1/00; H04B 1/69; H04B 1/707; H04B 7/212; H04J 3/00; H04J 3/06; H04J 3/0638; H04L 7/0012; H04L 27/06; H04L 29/06; H04W 12/08; H04W 56/002; H04W 56/005; H04W 56/009
USPC ........ 340/12.5, 601; 370/350; 375/138, 239, 375/324, 333, 340, 354, 359, 360, 361; 704/500
See application file for complete search history.

(56) References Cited

U.S. PATENT DOCUMENTS

| | | | | |
|---|---|---|---|---|
| 7,466,772 B2* | 12/2008 | Bertram | .............. | H04L 25/4904 375/333 |
| 8,031,690 B2* | 10/2011 | Aiello | ............... | H04W 56/0015 370/329 |
| 2004/0047307 A1* | 3/2004 | Yoon | ................... | H04B 7/2693 370/324 |
| 2004/0234000 A1* | 11/2004 | Page | ........................ | H04J 3/00 375/259 |
| 2010/0034190 A1* | 2/2010 | Yun | .................... | H04W 56/0035 370/350 |
| 2011/0063094 A1* | 3/2011 | Meiertoberens | ..... | A61B 5/0002 340/12.5 |

(Continued)

*Primary Examiner* — Shawkat M Ali
(74) *Attorney, Agent, or Firm* — CKC & Partners Co., LLC (57) ABSTRACT A synchronization method, suitable between a first electronic device and a second electronic device, includes following operations. A first pulse of a wireless signal sent from the first electronic device is received by the second electronic device. A first status of the second electronic device is determined. A second pulse of the wireless signal is received after the first pulse. A receiving time gap between the first pulse being received and the second pulse being received by the second electronic device is measured. A new status of the second electronic device is determined according to the receiving time gap and the first status of the second electronic device. Whether to synchronize a system clock on the second electronic device with the second pulse of the wireless signal is determined according to the new status.

18 Claims, 6 Drawing Sheets

FIG. 2

(56) References Cited

U.S. PATENT DOCUMENTS

2011/0274141 A1* 11/2011 Jantunen .............. H04B 1/7183
375/138
2013/0197920 A1* 8/2013 Lesso .................. H04L 25/4902
704/500
2015/0200706 A1* 7/2015 Bottazzi .................... G01S 7/40
375/140

* cited by examiner

COMMUNICATION SYSTEM AND SYNCHORONIZATION METHOD THEREOF

CROSS-REFERENCE TO RELATED APPLICATION

This application claims priority to U.S. Provisional Application Ser. No. 62/592,377, filed on Nov. 29, 2017, which is herein incorporated by reference.

BACKGROUND

Field of Invention

Present disclosure relates to a communication system and a synchronization method thereof. More particularly, the present disclosure relates to how to synchronization of system clocks between two devices in the communication system.

Description of Related Art

When two devices are communicating wirelessly with each other, these two devices need a common time reference, such that a transmitter of these two devices can transmit data at correct timing and a receiver of these two devices can sample or receive data also at correct timing. If these two devices are not synchronized with each other, some errors may occur to the data transmitted between these two devices.

Sometimes, these two devices may exchange signals for time synchronization. If the signals for time synchronization are transmitted wirelessly, the signals for time synchronization can also be interfered by background noises or blocked by some obstacles, the wireless signals affected by interference may lead to some mistakes in time synchronization.

SUMMARY

An embodiment of the disclosure provides a synchronization method, which is suitable between a first electronic device and a second electronic device. The synchronization method include following operations. A first pulse of a wireless signal sent from the first electronic device is received by the second electronic device. A first status of the second electronic device is determined. A second pulse of the wireless signal is received after the first pulse. A receiving time gap between the first pulse being received and the second pulse being received by the second electronic device is measured. A new status of the second electronic device is determined according to the receiving time gap and the first status of the second electronic device. Whether to synchronize a system clock on the second electronic device with the second pulse of the wireless signal is determined according to the new status.

Another embodiment of the disclosure provides a communication system, which includes a first electronic device and a second electronic device. The first electronic device includes a wireless transmitter configured to send a wireless signal. The wireless signal includes a series of periodic pulses. The second electronic device includes a wireless receiver and a processor. The wireless receiver is configured to receive a first pulse of the wireless signal and a second pulse of the wireless signal after the first pulse. The processor is configured to determine a first status of the second electronic device in response to the first pulse being received. The processor is further configured to measure a receiving time gap between the first pulse being received and the second pulse being received in response to the second pulse being received. The processor is further configured to determine a new status of the second electronic device according to the receiving time gap and the first status of the second electronic device. The processor is further configured to determine whether to synchronize a system clock on the second electronic device with the second pulse of the wireless signal according to the new status.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
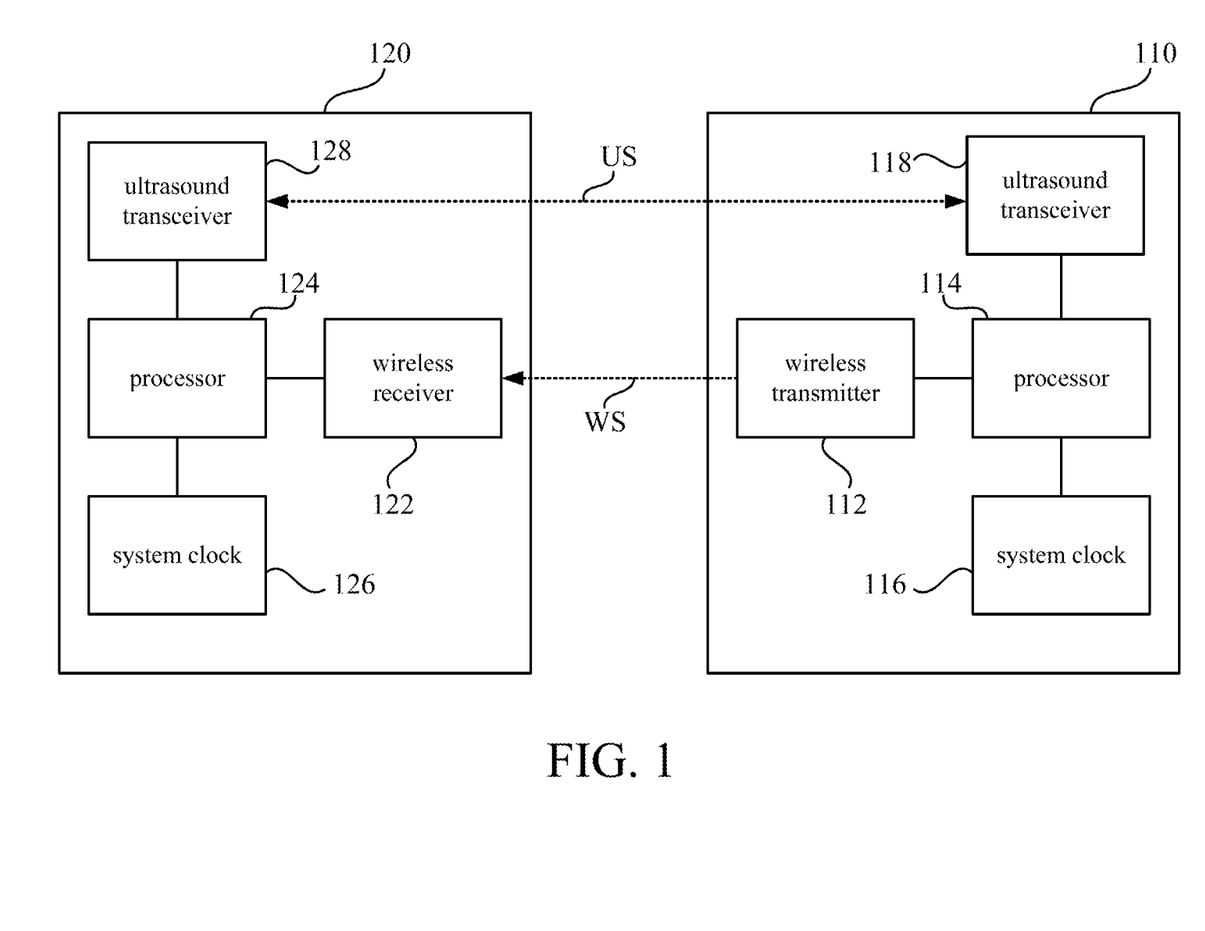
FIG. 1 is a schematic diagram illustrating a communication system according to some embodiments of the present disclosure.

Reference is made to FIG. 1. FIG. 1 is a schematic diagram illustrating a communication system 100 according to some embodiments of the present disclosure. In embodiments shown in FIG. 1, the communication system 100 includes a first electronic device 110 and a second electronic device 120. The first electronic device 110 and the second electronic device 120 in the communication system 100 are communicated with each other to exchange some data (e.g., files, control signals, information or alike).

As embodiments shown in FIG. 1, the first electronic device 110 includes a wireless transmitter 112, a processor 114 and a system clock 116. On the other hand, the second electronic device 120 includes a wireless receiver 122, a processor 124 and a system clock 126. In order to make sure the communication between the first electronic device 110 and the second electronic device 120 (or functions based on aforesaid communication) works properly, the communication 100 is configured to synchronize the system clock 116 in the first electronic device 110 with the system clock 126 in the second electronic device 120. When the first electronic device 110 has the system clock 116 synchronized with the system clock 126 in the second electronic device 120, these two electronic devices will have a common time reference to sample data, encrypt message or perform time-relevant functions.

In some embodiments, the wireless transmitter 112 can be implemented by a radio frequency transmitter circuit or a radio frequency transceiver circuit, and the wireless receiver 122 can be a radio frequency receiver circuit or a radio frequency transceiver circuit. However, the disclosure is not limited thereto.

In some other embodiments, the wireless transmitter 112 can be implemented by an infrared transceiver circuit, a laser transceiver circuit, an electromagnetic wave transceiver circuit or an optical transceiver circuit. The wireless receiver 122 can be implemented by an infrared transceiver circuit, a laser transceiver circuit, an electromagnetic wave transceiver circuit or an optical transceiver circuit in correspondence with the wireless transmitter 112.

In some embodiments, the processor 114 and the processor 124 can be implemented by central processing units, control circuits, application-specific integrated circuits (ASIC), graphic processing units or other equivalent processing circuit.

In some embodiments, the system clock 116 and the system clock 126 can be implemented by timer circuits or oscillator circuits in the first electronic device 110 and the second electronic device 120. In some other embodiments, the system clock 116 and the system clock 126 can be implemented by software-based programs or instructions executed by the processor 114 and the processor 124 to generate or accumulate system time counts in the first electronic device 110 and the second electronic device 120.

As embodiments shown in FIG. 1, the wireless transmitter 112 of the first electronic device 110 is configured to send a wireless signal WS to the second electronic device 120. The wireless signal WS transmitted from the first electronic device 110 to the second electronic device 120 is utilized as a reference to synchronize the system clocks 116 and 126.

In some occasional situations, the wireless signal WS transmitted from the first electronic device 110 to the second electronic device 120 can be interfered by background noises or delayed by some obstacles. If the second electronic device 120 utilizes the wireless signal WS which is interfered or delayed to synchronize, it will lead to a mistake or an error in time synchronization. In some embodiments in this disclosure, the second electronic device 120 in the communication system 100 is configured to ignore a portion of the wireless signal WS when the portion of the wireless signal WS is interfered or delayed, so as to make sure the synchronization between the first electronic device 110 to the second electronic device 120 work properly. Details about how to recognize the portion of the wireless signal WS are discussed in following paragraphs.

Figure 2:
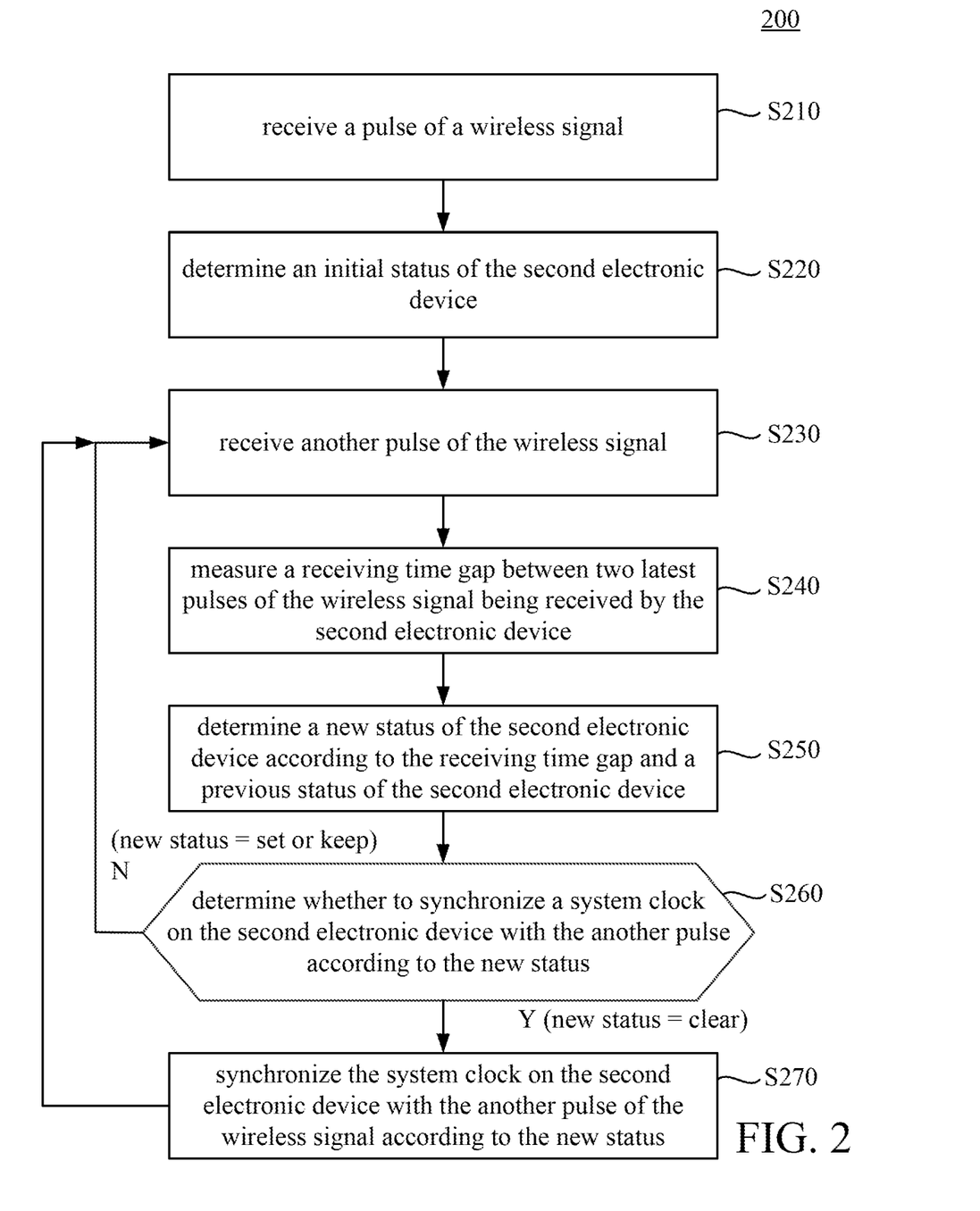
FIG. 2 is a flow chart illustrating a synchronization method according to some embodiments of the disclosure.
Figure 3:
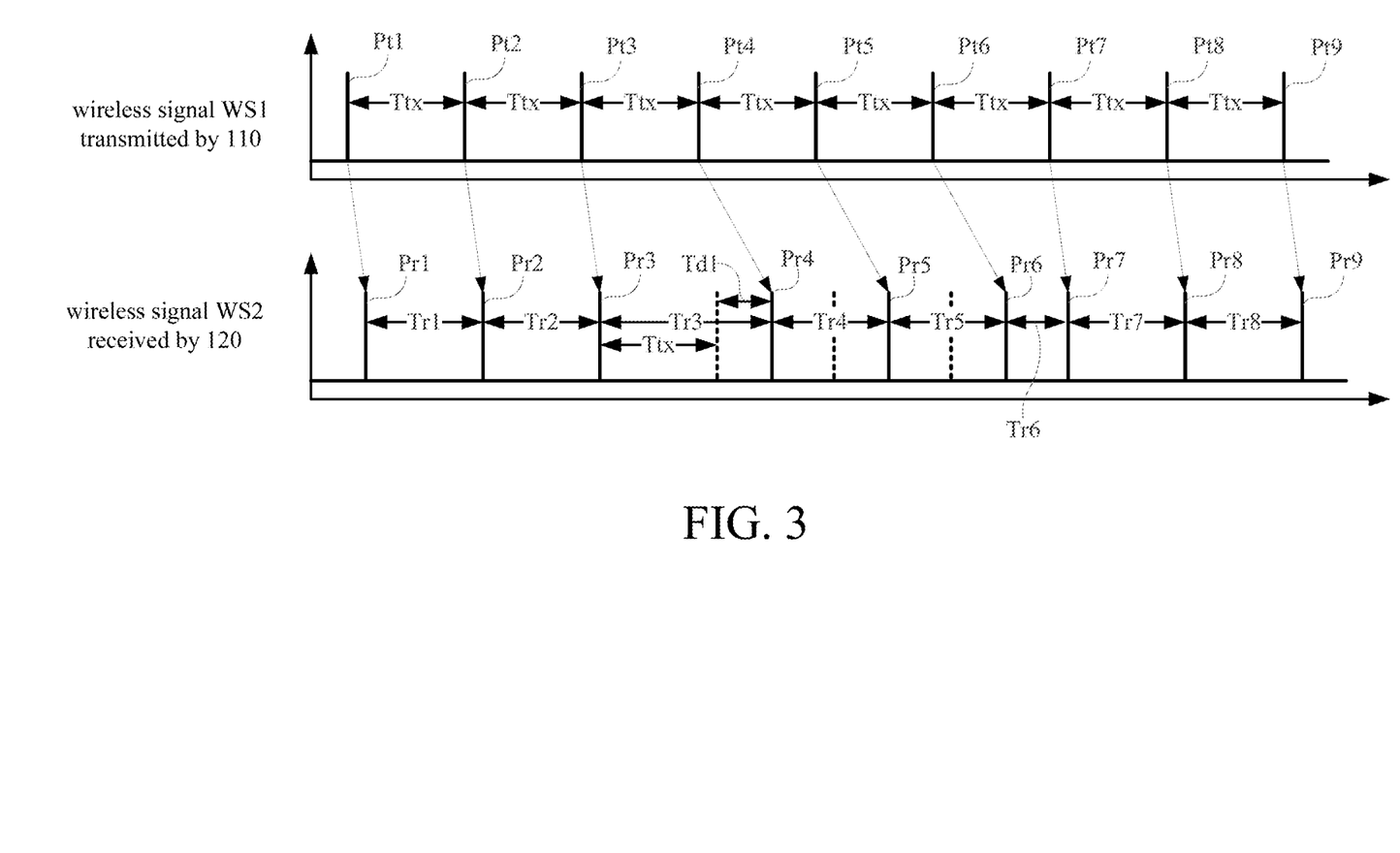
FIG. 3 is a schematic diagram illustrating a wireless signal transmitted by the first electronic device and a corresponding wireless signal received by the second electronic device in an exemplary case according to some embodiments of the disclosure.

Reference is further made to FIG. 2 and FIG. 3. FIG. 2 is a flow chart illustrating a synchronization method 200 according to some embodiments of the disclosure. FIG. 3 is a schematic diagram illustrating a wireless signal WS1 transmitted by the first electronic device 110 and a corresponding wireless signal WS2 received by the second electronic device 120 in an exemplary case according to some embodiments of the disclosure. In some embodiments, the synchronization method 200 in FIG. 2 is suitable to be utilized between the first electronic device 110 and the second electronic device 120 in the communication system 100 in FIG. 1.

Referring to FIG. 1, the wireless transmitter 112 of the first electronic device 110 is configured to send the wireless signal WS. As shown in FIG. 3, the wireless signal WS1 sent from the first electronic device 110 includes a series of periodic pulses Pt1, Pt2, Pt3, Pt4 . . . Pt9. In some embodiments, the pulses Pt1, Pt2, Pt3, Pt4 . . . Pt9 are generated every a transmission period Ttx. For example, the pulses Pt1, Pt2, Pt3, Pt4 . . . Pt9 are generated every 10 milliseconds.

In other words, each adjacent two of the periodic pulses are gapped with the transmission period Ttx. For example, a time gap between the periodic pulses Pt1 and Pt2 equals to the transmission period Ttx; another time gap between the periodic pulses Pt2 and Pt3 also equals to the same transmission period Ttx; and another time gap between the periodic pulses Pt3 and Pt4 also equals to the same transmission period Ttx.

The wireless signal WS1 sent from the first electronic device 110 will be received by the second electronic device 120. FIG. 3 illustrate embodiments of the wireless signal WS2 received by the second electronic device 120 in the exemplary case. The wireless signal WS2 received by the second electronic device 120 also includes pulses Pr1, Pr2, Pr3, Pr4 . . . Pr9 corresponding to the pulses Pt1, Pt2, Pt3, Pt4 . . . Pt9 in the wireless signal WS1.

In an ideal case, if the transmission is not interfered or delayed, each adjacent two of the pulses Pr1, Pr2, Pr3, Pr4 . . . Pr9 received by the second electronic device 120 can be expected to have a time gap equal to the transmission period Ttx.

Referring to FIG. 1 and FIG. 2, in the synchronization method 200, operation S210 is executed to receive a pulse of the wireless signal WS sent from the first electronic device 110 by the second electronic 120.

As shown in FIG. 3, at first, the pulse Pr1 of the wireless signal WS2 is received by the second electronic 120. Operation S220 is executed to determine an initial status of the second electronic 120. In some embodiments of the communication system 100, the second electronic 120 are configured to be in one status selected from a clear flag status, a set flag status and a keep flag status. In operation S220, the initial status of the second electronic 120 can be configured into "clear flag status" by default.

In order to clearly show the statuses and receiving time gaps relative to each one of the received pulses, Table 1 is provided as below. Table 1 demonstrates an example about the statuses relative to each of the pulses Pr1, Pr2, Pr3, Pr4 . . . Pr9 in the wireless signal WS2 received by the second electronic 120 in the embodiments shown in FIG. 3.

TABLE 1

| Received pulse | Previous Status | Receiving time gap | New Status | Synchronize or not |
|---|---|---|---|---|
| Pr1 | N/A | N/A | clear | N/A |
| Pr2 | clear | Tr1 = 10 ms | clear | Y |
| Pr3 | clear | Tr2 = 10 ms | clear | Y |
| Pr4 | clear | Tr3 = 14 ms | set | N |
| Pr5 | set | Tr4 = 10 ms | set | N |
| Pr6 | set | Tr5 = 10 ms | set | N |
| Pr7 | set | Tr6 = 6 ms | keep | N |
| Pr8 | keep | Tr7 = 10 ms | clear | Y |
| Pr9 | clear | Tr8 = 10 ms | clear | Y |

As shown in FIG. 1 and Table 1, a new status (i.e., the initial status) relative to the pulse Pr1 is assigned to the second electronic 120 as shown in the second row of Table 1.

As shown in FIG. 1 to FIG. 3, operation S230 is executed to receive another pulse Pr2 of the wireless signal WS2 after the pulse Pr1. Operation S240 is executed to measure a receiving time gap Tr1 between the pulse Pr1 being received and the pulse Pr2 being received by the second electronic device 120. In the embodiments as shown in FIG. 3, the receiving time gap Tr1 between the pulses Pr1 and Pr2 is equal to the transmission period Ttx between the pulses Pt1 and Pt2. In this example, the transmission period Ttx is set as 10 milliseconds for demonstration, but the transmission period Ttx is not limited thereto. It is assumed that the wireless signal WS transmitted from the first electronic device 110 to the second electronic device 120 is not affected by any noise nor blocked by any obstacle while the pulse Pt2/Pr2 is transmitting, such that the receiving time gap Tr1 measure between the pulses Pr1 and Pr2 will be equal to (or similar to) 10 milliseconds, which corresponds to the transmission period Ttx.

Operation S250 is executed to determine a new status of the second electronic device 120 relative to the pulse Pr2 according to the receiving time gap Tr1 and a previous status of the second electronic device 120. It is noticed that the previous status relative to the current pulse Pr2 means the new status relative to the previous pulse Pr1. Therefore, the previous status relative to the current pulse Pr2 is "clear flag status".

Figure 4:
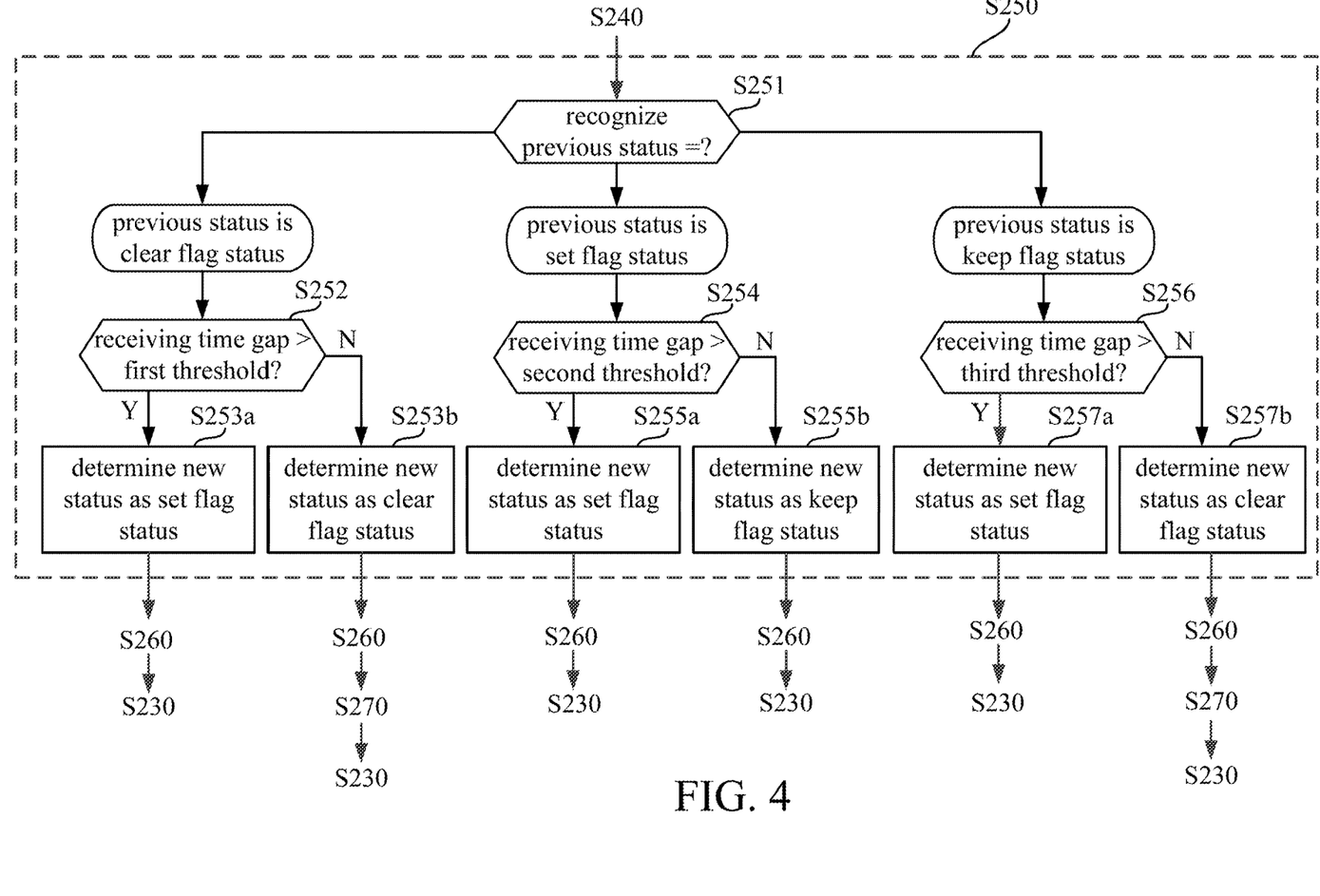
FIG. 4 is a flow diagram illustrating further operations in one operation shown in FIG. 2 according to some embodiments.

Reference is further made to FIG. 4, which is a flow diagram illustrating further operations in operation S250 in FIG. 2 according to some embodiments. As shown in FIG. 4, operation S251 is executed to recognize the previous status relative to the pulse Pr2. In this case, the previous status relative to the pulse Pr2 is "clear flag status", operation S252 is executed to compare the receiving time gap Tr1 with a first threshold. In some embodiments, the first threshold is configured to be equal to a sum of the transmission period Ttx and a tolerance.

In some embodiments, the tolerance can be defined according to a preciseness requirement of the communication system 100 and/or characteristics of the wireless signal WS. The tolerance will be smaller when the preciseness requirement of the communication system 100 is higher, and the tolerance will be larger when the preciseness requirement of the communication system 100 is lower. On the other hands, the tolerance will be smaller when the wireless signal WS has a faster transmission speed (e.g., the wireless signal WS is a radio frequency signal), and the tolerance will be larger when the wireless signal WS has a slower transmission speed (e.g., the wireless signal WS is an ultrasound signal).

In the example, it is assumed that the tolerance is configured to be 5 μs, and the first threshold is equal to 10005 μs (10 ms+5 μs).

In the comparison of operation S252, the receiving time gap Tr1 (10 ms=10000 μs) relative to the pulse Pr2 is lower than the first threshold (10005 μs), such that operation S253b is executed to determine the new status of the second electronic device 120 relative to the pulse Pr2 to be "clear flag status". In other words, the status of the second electronic device 120 remains in the "clear flag status" relative to the pulse Pr2.

As shown in FIG. 2 and FIG. 4, operation S260 is executed to determining whether to synchronize the system clock 126 on the second electronic device 120 with the pulse Pr2 of the wireless signal WS2 according to the new status.

In some embodiments, in response to that the new status is determined to be the clear flag status in S250, the second electronic device 120 will execute operation S270 to synchronize the system clock 126 with the pulse Pr2. As shown Table 1, the new status relative to the pulse Pr2 is determined to be "clear flag status" and the synchronization is executed in reference to the pulse Pr2 as shown in the third row of Table 1.

It is noticed that, the synchronization between the first electronic device 110 and the second electronic device 120 is executed in reference to the pulse Pt2 on the first electronic device 110 and the pulse Pr2 on the second electronic device 120. As shown in FIG. 3, a time point that the pulse Pr2 is received by the second electronic device 120 may be a little bit later than a time point that the pulse Pt2 is sent by the first electronic device 110. In some embodiments, a time interval from sending the pulse Pt2 to receiving the pulse Pr2 can be estimated. The estimated value can be decided by a sum of a system response time on the first electronic device 110 to transmit the pulse Pt2, another system response time on the second electronic device 110 to receive the pulse Pr2 and a travel time of the wireless signal WS. In some embodiments, the estimated value can be assumed to be a fixed value by the second electronic device 120. In order to synchronize the first system clock 116 and the second system clock 126, the second electronic device 120 can consider the pulse Pr2 and also the estimated value. For example, if the estimated value is assumed to be 1 μs, the second electronic device 120 can synchronize the second system clock 126 to a time count at 1 μs before the pulse Pr2 arrives (i.e., the arrival time of Pr2−1 μs). In another example, the second electronic device 120 can synchronize the second system clock 126 to another time count equal to the arrival time of Pr2 adds transmission period Ttx and deducts the estimated value (i.e., the arrival time of Pr2+ 10000 μs−1 μs).

After operation S270, the synchronization method 200 will return to operation S230 as shown in FIG. 2 and FIG. 4. Operation S230 is executed to receive another pulse Pr3 after the pulse Pr2. Operation S240 is executed to measure a receiving time gap Tr2 between the pulse Pr2 and the pulse Pr3.

It is assumed that the wireless signal WS transmitted from the first electronic device 110 to the second electronic device 120 is not affected by any noise nor blocked by any obstacle while the pulse Pt3/Pr3 is transmitting, such that the receiving time gap Tr2 measure between the pulses Pr2 and Pr3 will also be equal to (or similar to) 10 milliseconds, which corresponds to the transmission period Ttx.

Operation S250 is executed to determine a new status of the second electronic device 120 relative to the pulse Pr3 according to the receiving time gap Tr2 and a previous status of the second electronic device 120 relative to the pulse Pr3. It is noticed that the previous status relative to the current pulse Pr3 means the new status relative to the previous pulse Pr2. Therefore, the previous status relative to the current pulse Pr3 is "clear flag status".

As shown in FIG. 4, operation S251 is executed to recognize the previous status relative to the pulse Pr3. In this case, the previous status relative to the pulse Pr3 is "clear flag status", operation S252 is executed to compare the receiving time gap Tr2 with the first threshold, which is assumed to be 10005 μs (10 ms+5 μs) for demonstration.

In the comparison of operation S252, the receiving time gap Tr2 (10 ms) relative to the pulse Pr3 is lower than the first threshold (10005 μs), such that operation S253b is executed to determine the new status of the second electronic device 120 relative to the pulse Pr3 to be "clear flag status". In other words, the status of the second electronic device 120 remains in the "clear flag status" relative to the pulse Pr3.

As shown in FIG. 2 and FIG. 4, operation S260 is executed to determining whether to synchronize the system clock 126 on the second electronic device 120 with the pulse Pr3 of the wireless signal WS2 according to the new status.

In some embodiments, in response to that the new status is determined to be "clear flag status" in S250, the second electronic device 120 will execute operation S270 to synchronize the system clock 126 with the pulse Pr3. As shown Table 1, the new status relative to the pulse Pr3 is determined to be "clear flag status" and the synchronization is executed in reference to the pulse Pr3 as shown in the fourth row of Table 1.

Once again, the synchronization method 200 will return to operation S230 as shown in FIG. 2 and FIG. 4. Operation S230 is executed to receive another pulse Pr4 after the pulse Pr3. Operation S240 is executed to measure a receiving time gap Tr3 between the pulse Pr3 and the pulse Pr4.

It is assumed that the wireless signal WS transmitted from the first electronic device 110 to the second electronic device 120 may be affected by some background noises or blocked by some obstacles while the pulse Pt4/Pr4 is transmitting, such that as shown in FIG. 3, the pulse Pr4 received by the second electronic device 120 is delayed. In this case, the receiving time gap Tr3 measured between the pulses Pr3 and Pr4 will be relatively longer compared to the transmission period Ttx. It is assumed that the receiving time gap Tr3 is measured to be 14 ms because the pulse Pr4 is delayed during the wireless transmission. In some embodiment, a delay time length Td1 of the pulse Pr4 can be determined according a difference between the receiving time gap Tr3 and the transmission period Ttx. As shown in FIG. 3, a delay time length Td1 of the pulse Pr4 can be calculated as the receiving time gap Tr3 deducting the transmission period Ttx (i.e., the delay time length Td1=Tr3−Ttx). In this case, the delay time length Td1 is measured to be 4 milliseconds.

Operation S250 is executed to determine a new status of the second electronic device 120 relative to the pulse Pr4 according to the receiving time gap Tr3 and a previous status of the second electronic device 120 relative to the pulse Pr4. It is noticed that the previous status relative to the current pulse Pr4 means the new status relative to the previous pulse Pr3. Therefore, the previous status relative to the current pulse Pr4 is "clear flag status".

As shown in FIG. 4, operation S251 is executed to recognize the previous status relative to the pulse Pr4. In this case, the previous status relative to the pulse Pr4 is "clear flag status", operation S252 is executed to compare the receiving time gap Tr3 with the first threshold, which is assumed to be 10005 μs (10 ms+5 μs) for demonstration.

In the comparison of operation S252, the receiving time gap Tr3 (14 ms=14000 μs) relative to the pulse Pr4 exceeds than the first threshold (10005 μs), such that operation S253a is executed to determine the new status of the second electronic device 120 relative to the pulse Pr4 to be "set flag status". In other words, the status of the second electronic device 120 is changed into the "set flag status" relative to the pulse Pr4.

As shown in FIG. 2 and FIG. 4, operation S260 is executed to determining whether to synchronize the system clock 126 on the second electronic device 120 with the pulse Pr4 of the wireless signal WS2 according to the new status.

In some embodiments, in response to that the new status is determined to be "set flag status" in S250, the second electronic device 120 will return to operation S230 without performing the synchronization. In other words, the second electronic device 120 does not synchronize the system clock 126 with the pulse Pr4 in response to that the new status is determined to be the set flag status. As shown Table 1, the new status relative to the pulse Pr4 is determined to be "set flag status" and the synchronization is not executed in reference to the pulse Pr4 as shown in the fifth row of Table 1. During the pulse Pr4 is received and processed, the delay time length Td1 is measured under a condition that the previous status relative to the pulse Pr4 is in the "clear flag status" and the new status relative to the pulse Pr4 is determined as the "set flag status".

Once again, the synchronization method 200 will return to operation S230 as shown in FIG. 2 and FIG. 4. Operation S230 is executed to receive another pulse Pr5 after the pulse Pr4. Operation S240 is executed to measure a receiving time gap Tr4 between the pulse Pr4 and the pulse Pr5.

It is assumed that the wireless signal WS transmitted from the first electronic device 110 to the second electronic device 120 is still affected by some background noises or blocked by some obstacles while the pulse Pt5/Pr5 is transmitting, such that as shown in FIG. 3, the pulse Pr5 received by the second electronic device 120 is also delayed. In this case, the receiving time gap Tr4 measured is equal to (or similar to) the transmission period Ttx. It is assumed that the background noises or the blocking obstacle keep interfering the wireless signals WS at the same level, such that a delay to the pulse Pr5 can be similar to the pulse Pr4. Therefore, the gap Tr4 may be observed to be similar to the transmission period Ttx. It is assumed that the receiving time gap Tr4 is measured to be 10 ms, which corresponds to the transmission period Ttx.

Operation S250 is executed to determine a new status of the second electronic device 120 relative to the pulse Pr5 according to the receiving time gap Tr4 and a previous status of the second electronic device 120 relative to the pulse Pr5. It is noticed that the previous status relative to the current pulse Pr5 means the new status relative to the previous pulse Pr4. Therefore, the previous status relative to the current pulse Pr5 is "set flag status".

As shown in FIG. 4, operation S251 is executed to recognize the previous status relative to the pulse Pr5. In this case, the previous status relative to the pulse Pr5 is "set flag status", operation S254 is executed to compare the receiving time gap Tr4 with a second threshold. The second threshold is calculated as the transmission period Ttx deducting a deduction value.

In some embodiments, the deduction value is determined according to a tolerance, which can be 5 μs, such that the second threshold is equal to the transmission period Ttx (10 ms) deducting the tolerance (5 µs) and the second threshold is configured to be 9995 µs.

In some other embodiments, the second threshold is calculated as the transmission period Ttx deducting a specific portion (e.g., 50%, 70% or 100%) of the delay time length Td1 (e.g., 4 ms). For example, the second threshold can be calculated as the transmission period Ttx deducting 50% of the delay time length Td1, such that the second threshold (=Ttx−Td1*50%) is equal to 8 ms (10 ms−4 ms*0.5). In another example, the second threshold can be calculated as the transmission period Ttx deducting 100% of the delay time length Td1, such that the second threshold (=Ttx−Td1) is equal to 6 ms (10 ms−4 ms).

In some embodiments, the second threshold is not configured to be lower than the transmission period Ttx deducting 100% of the delay time length Td1. If the second threshold is configured to be lower than the transmission period Ttx deducting 100% of the delay time length Td1, the synchronization method 200 may not be able to trigger the keep flag status properly.

In the comparison of operation S254, the receiving time gap Tr4 (10 ms) relative to the pulse Pr5 exceeds than the second threshold (assumed to be 6 ms in this case), such that operation S255a is executed to determine the new status of the second electronic device 120 relative to the pulse Pr5 to be "set flag status". In other words, the status of the second electronic device 120 remains as the "set flag status" relative to the pulse Pr5.

As shown in FIG. 2 and FIG. 4, operation S260 is executed to determining whether to synchronize the system clock 126 on the second electronic device 120 with the pulse Pr5 of the wireless signal WS2 according to the new status.

In response to that the new status is determined to be "set flag status" in S250, the second electronic device 120 will return to operation S230 without performing the synchronization. In other words, the second electronic device 120 does not synchronize the system clock 126 with the pulse Pr5 in response to that the new status is determined to be the set flag status. As shown Table 1, the new status relative to the pulse Pr5 is determined to be "set flag status" and the synchronization is not executed in reference to the pulse Pr5 as shown in the sixth row of Table 1.

Similar to the processing relative to the pulse Pr5, operations S230, S240, S251, S254, S255a will be executed during the processing of the pulse Pr6, as shown Table 1, the new status relative to the pulse Pr6 is determined to be "set flag status" and the synchronization is not executed in reference to the pulse Pr6 as shown in the seventh row of Table 1.

Once again, the synchronization method 200 will return to operation S230 as shown in FIG. 2 and FIG. 4. Operation S230 is executed to receive another pulse Pr7 after the pulse Pr6. Operation S240 is executed to measure a receiving time gap Tr6 between the pulse Pr6 and the pulse Pr7.

It is assumed that the wireless signal WS transmitted from the first electronic device 110 to the second electronic device 120 is not affected by any background noise or blocked by some obstacles anymore while the pulse Pt7/Pr7 is transmitting, such that as shown in FIG. 3, the pulse Pr7 received by the second electronic device 120 is no longer delayed. In this case, the receiving time gap Tr6 measured will be shorter the transmission period Ttx. It is assumed that the receiving time gap Tr6 is measured to be 6 ms.

Operation S250 is executed to determine a new status of the second electronic device 120 relative to the pulse Pr7 according to the receiving time gap Tr6 and a previous status of the second electronic device 120 relative to the pulse Pr7. It is noticed that the previous status relative to the current pulse Pr7 means the new status relative to the previous pulse Pr6. Therefore, the previous status relative to the current pulse Pr7 is "set flag status".

As shown in FIG. 4, operation S251 is executed to recognize the previous status relative to the pulse Pr7. In this case, the previous status relative to the pulse Pr7 is "set flag status", operation S254 is executed to compare the receiving time gap Tr6 with the second threshold, which is equal to 6 ms.

In the comparison of operation S254, the receiving time gap Tr6 (6 ms) relative to the pulse Pr7 is equal to the second threshold (6 ms), such that operation S255b is executed to determine the new status of the second electronic device 120 relative to the pulse Pr7 to be "keep flag status". In other words, the status of the second electronic device 120 changes into the "keep flag status" relative to the pulse Pr7.

As shown in FIG. 2 and FIG. 4, operation S260 is executed to determining whether to synchronize the system clock 126 on the second electronic device 120 with the pulse Pr7 of the wireless signal WS2 according to the new status.

In response to that the new status is determined to be "keep flag status" in S250, the second electronic device 120 will return to operation S230 without performing the synchronization. In other words, the second electronic device 120 does not synchronize the system clock 126 with the pulse Pr7 in response to that the new status is determined to be the keep flag status. As shown Table 1, the new status relative to the pulse Pr7 is determined to be "keep flag status" and the synchronization is not executed in reference to the pulse Pr7 as shown in the eighth row of Table 1.

Once again, the synchronization method 200 will return to operation S230 as shown in FIG. 2 and FIG. 4. Operation S230 is executed to receive another pulse Pr8 after the pulse Pr7. Operation S240 is executed to measure a receiving time gap Tr7 between the pulse Pr7 and the pulse Pr8. It is assumed that the transmission of the pulse Pr8 is no longer affected. Therefore, the receiving time gap Tr7 is equal to the transmission period Ttx (i.e., Tr7=10 ms).

As shown in FIG. 4, operation S251 is executed to recognize the previous status relative to the pulse Pr7. In this case, the previous status relative to the pulse Pr7 is "keep flag status", operation S256 is executed to compare the receiving time gap Tr6 with the third threshold. In some embodiments, the third threshold is configured to be equal to a sum of the transmission period Ttx and a tolerance. In the example, it is assumed that the tolerance is configured to be 5 µs according to the preciseness requirement of the communication system 100 and/or characteristics of the wireless signal WS. In this case, the third threshold is equal to 10005 µs (10 ms+5 µs).

In the comparison of operation S256, the receiving time gap Tr7 (10 ms) relative to the pulse Pr8 is shorter than the third threshold (10005 µs), such that operation S257b is executed to determine the new status of the second electronic device 120 relative to the pulse Pr8 to be "clear flag status". In other words, the status of the second electronic device 120 changes into the "clear flag status" relative to the pulse Pr8.

As shown in FIG. 2 and FIG. 4, operation S260 is executed to determining whether to synchronize the system clock 126 on the second electronic device 120 with the pulse Pr8 of the wireless signal WS2 according to the new status.

In response to that the new status is determined to be "clear flag status" in S250, the second electronic device 120 will execute operation S270 to synchronize the system clock 126 with the pulse Pr8. As shown Table 1, the new status relative to the pulse Pr8 is determined to be "clear flag status" and the synchronization is executed in reference to the pulse Pr8 as shown in the ninth row of Table 1.

Similar to the processing relative to the pulse Pr2 or Pr3, operations S230, S240, S251, S252 and S253b will be executed during the processing of the pulse Pr9, as shown Table 1, the new status relative to the pulse Pr9 is determined to be "clear flag status" and the synchronization is executed in reference to the pulse Pr9 as shown in the tenth row of Table 1.

Based on aforesaid embodiments, the pulses Pr4-Pr6, which are affected and delayed by background noises or blocking obstacles, are ignored/skipped and not utilized by the second electronic device 120 for synchronization. During the period from pulses Pr4 to Pr6, the second electronic device 120 relies on the system clock 126 which is previously synchronized in reference with the pulses Pr2-Pr3. When the second electronic device 120 receives the pulse Pr7 (which is recognized to be "keep flag status"), the second electronic device 120 does not resume the synchronization immediately according to the pulse Pr7 in this embodiment. The second electronic device 120 will confirm the wireless transmission is stable by processing the pulse Pr8, the second electronic device 120 can resume the synchronization after returning to "clear flag status" in this embodiment.

Figure 5:
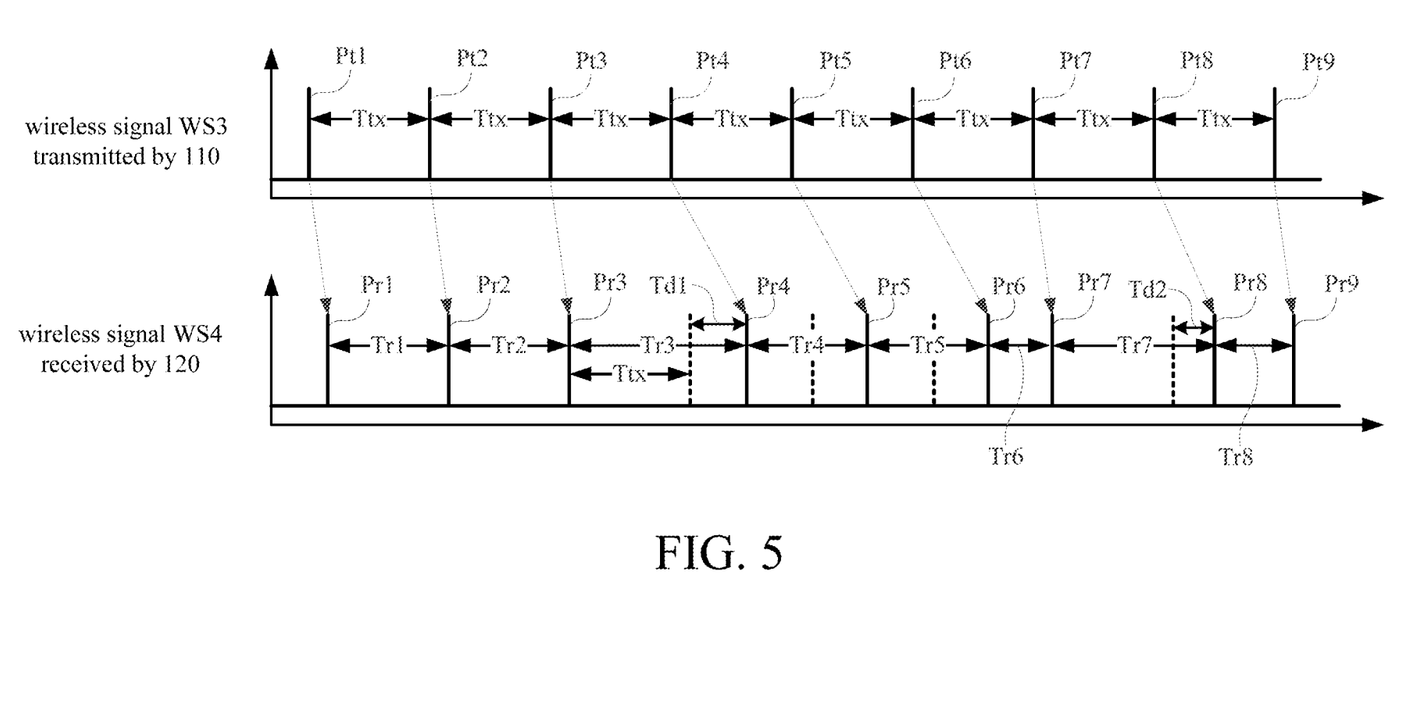
FIG. 5 is another schematic diagram illustrating a wireless signal transmitted by the first electronic device and a corresponding wireless signal received by the second electronic device in another exemplary case according to some embodiments of the disclosure.

Reference is further made to FIG. 5, which is another schematic diagram illustrating a wireless signal WS3 transmitted by the first electronic device 110 and a corresponding wireless signal WS4 received by the second electronic device 120 in another exemplary case according to some embodiments of the disclosure.

Table 2 demonstrates another example about the statuses relative to each of the pulses Pr1, Pr2, Pr3, Pr4 . . . Pr9 in the wireless signal WS4 received by the second electronic 120 in the embodiments shown in FIG. 5.

TABLE 2

| Received pulse | Previous Status | Receiving time gap | New Status | Synchronize or not |
|---|---|---|---|---|
| Pr1 | N/A | N/A | clear | N/A |
| Pr2 | clear | Tr1 = 10 ms | clear | Y |
| Pr3 | clear | Tr2 = 10 ms | clear | Y |
| Pr4 | clear | Tr3 = 14 ms | set | N |
| Pr5 | set | Tr4 = 10 ms | set | N |
| Pr6 | set | Tr5 = 10 ms | set | N |
| Pr7 | set | Tr6 = 6 ms | keep | N |
| Pr8 | keep | Tr7 = 13 ms | set | N |
| Pr9 | set | Tr8 = 7 ms | keep | N |

The processing relative to the Pr1-Pr7 in embodiments shown in FIG. 5 and Table 2 is similar to aforesaid embodiments about the processing relative to the Pr1-Pr7 in embodiments shown in FIG. 3 and Table 1, and not to be repeated again.

The main difference between this exemplary case shown in FIG. 5 from the exemplary case shown in FIG. 3 is that the pulse Pr8 received by the second electronic device 120 is delayed.

Operation S250 is executed to determine a new status of the second electronic device 120 relative to the pulse Pr8 according to the receiving time gap Tr7 and a previous status of the second electronic device 120 relative to the pulse Pr8.

As shown in FIG. 4, operation S251 is executed to recognize the previous status relative to the pulse Pr8. In this case, the previous status relative to the pulse Pr7 is "keep flag status", operation S256 is executed to compare the receiving time gap Tr7 with the third threshold, which is equal to 10005 µs.

In the comparison of operation S256, the receiving time gap Tr7 (13 ms=13000 µs) relative to the pulse Pr8 exceeds to the third threshold (10005 µs), such that operation S257a is executed to determine the new status of the second electronic device 120 relative to the pulse Pr8 to be "set flag status". In other words, the status of the second electronic device 120 changes into the "set flag status" relative to the pulse Pr8.

In processing of the later pulse Pr9, the new status of the second electronic device 120 relative to the pulse Pr9 is determined to be "keep flag status".

In this exemplary case, the pulses Pr4-Pr6 and Pr8 in the wireless signal WS4, which are affected and delayed by background noises or blocking obstacles, are ignored/skipped and not utilized by the second electronic device 120 for synchronization. In addition, the pulses Pr7 and Pr9 in the wireless signal WS4 are also ignored/skipped and not utilized by the second electronic device 120 for synchronization because the pulses Pr7 and Pr9 may not be stable enough.

In aforesaid embodiments, as shown in FIG. 1, the first electronic device 110 and the second electronic device 120 are able to configure the system clocks 116 and 126 to the same period according to the wireless signal WS. In other words, as shown in FIG. 3 and Table 1, the periods of the system clocks 116 and 126 can be configured to according to the pulses Pt2-Pt3 and Pr2-Pr3.

During the period of synchronization failure due to that the wireless signal is affected and delayed by background noises or blocking obstacles, the first electronic device 110 and the second electronic device 120 can still use the operating system clocks 116 and 126 as a reference to transmit or receive data between the two devices. Until the synchronization is successful again, such as the pulses Pt8-Pt9 and Pr8-Pr9 as shown in FIG. 3 and Table 1, the first electronic device 110 and the second electronic device 120 can synchronize their system clocks 116 and 126 again according to the pulses Pt8-Pt9 and Pr8-Pr9.

Figure 6:
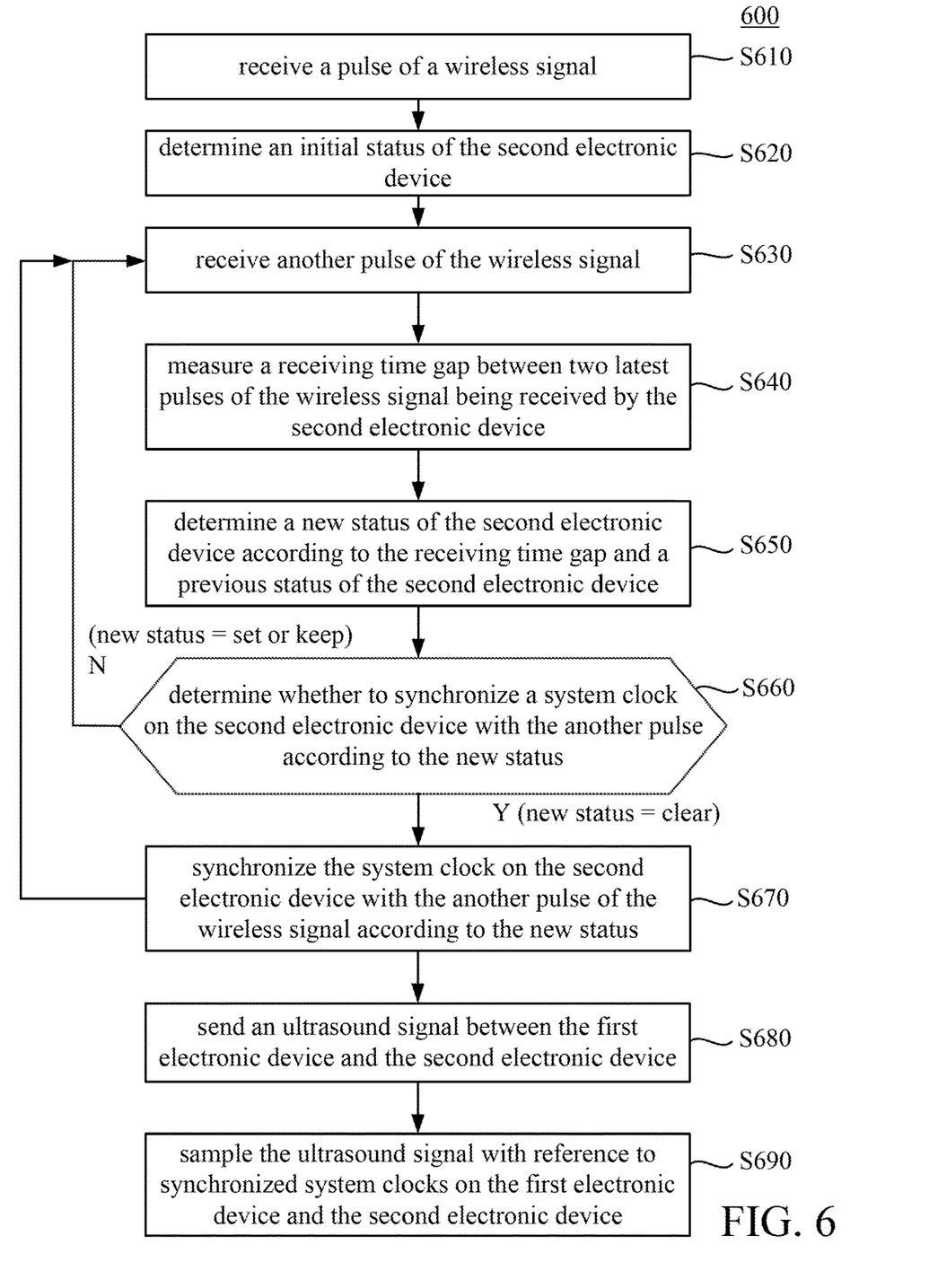
FIG. 6 is a flow chart illustrating a control method according to some embodiments of the disclosure.

Reference is further made to FIG. 6, which is a flow chart illustrating a control method 600 according to some embodiments of the disclosure. The control method 600 is suitable to be utilized on the communication system 100 as shown in FIG. 1. As discussed in aforesaid embodiments, the first electronic device 110 and the second electronic device 120 are able to synchronize their system clocks 116 and 126 according to the wireless signal WS. The system clocks after synchronization can be utilized in various functions between the first electronic device 110 and the second electronic device 120.

As shown in FIG. 1, the first electronic device 110 may further include an ultrasound transceiver 118 and the second electronic device 120 may further include another ultrasound transceiver 128. The communication system 100 may execute the operations S610-S670 as shown in FIG. 6 to synchronize the system clock 116 in the first electronic device 110 and the system clock 126 in the second electronic device 120 as shown in FIG. 1. Details of operations S610-S670 are similar to the operations S210-S270 discussed in aforesaid embodiments, and not repeated here. The control method 600 further executes operation S680 to send an ultrasound signal US between the first electronic device 110 and the second electronic device 120. For example, the ultrasound signal US can be sent from the ultrasound transceiver 118 to the ultrasound transceiver 128, or sent from the ultrasound transceiver 128 to the ultrasound transceiver 118. Operation S690 is executed to sample the ultrasound signal US with reference to synchronized system clocks 116 and 126 on the first electronic device 110 and the second electronic device 120.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A synchronization method, operable between a first electronic device and a second electronic device, the synchronization method comprising:
   receiving, by the second electronic device, a first pulse of a wireless signal sent from the first electronic device;
   determining a first status of the second electronic device, wherein the first status is selected from one of a clear flag status, a set flag status and a keep flag status;
   receiving a second pulse of the wireless signal after the first pulse;
   measuring a received time gap between the first pulse being received and the second pulse being received by the second electronic device;
   determining a new status of the second electronic device according to the received time gap and the first status of the second electronic device, wherein the new status is selected from one of the clear flag status, the set flag status and the keep flag status; and
   determining whether to synchronize a system clock on the second electronic device with the second pulse of the wireless signal according to the new status.

2. The synchronization method of claim 1, wherein the second electronic device is determined to synchronize the system clock with the second pulse in response to that the new status is determined to be the clear flag status, and the second electronic device is determined to not synchronize the system clock with the second pulse in response to that the new status is determined to be the set flag status or the keep flag status.

3. The synchronization method of claim 2, wherein under a condition that the first status is in the clear flag status, the new status is determined by:
   comparing the received time gap with a first threshold;
   in response to the received time gap exceeds the first threshold, determining the new status as the set flag status; and
   in response to the received time gap is shorter or equal to the first threshold, determining the new status as the clear flag status.

4. The synchronization method of claim 3, wherein the first electronic device sends a series of periodic pulses of the wireless signal to the second electronic device, the series of periodic pulses comprises the first pulse and the second pulse, and each adjacent two of the periodic pulses are gapped with a transmission period, wherein the first threshold is configured according to a sum of the transmission period and a tolerance.

5. The synchronization method of claim 2, wherein under a condition that the first status is in the set flag status, the new status is determined by:
   comparing the received time gap with a second threshold;
   in response to the received time gap exceeds the second threshold, determining the new status as the set flag status; and
   in response to the received time gap is shorter than or equal to the second threshold, determining the new status as the keep flag status.

6. The synchronization method of claim 5, wherein the first electronic device sends a series of periodic pulses of the wireless signal to the second electronic device, the series of periodic pulses comprises the first pulse and the second pulse, and each adjacent two of the periodic pulses are gapped with a transmission period, wherein the second threshold is configured according to the transmission period deducting a deduction value, wherein the deduction value is determined according to a tolerance or a delay time length.

7. The synchronization method of claim 6, wherein the delay time length is measured according to a difference between the received time gap and the transmission period under a condition that the first status is in the clear flag status and the new status is determined as the set flag status.

8. The synchronization method of claim 2, wherein under a condition that the first status is in the keep flag status, the new status is determined by:
   comparing the received time gap with a third threshold;
   in response to the received time gap exceeds the third threshold, determining the new status as the set flag status; and
   in response to the received time gap is shorter or equal to the third threshold, determining the new status as the clear flag status.

9. The synchronization method of claim 8, wherein the first electronic device sends a series of periodic pulses of the wireless signal to the second electronic device, the series of periodic pulses comprises the first pulse and the second pulse, and each adjacent two of the periodic pulses are gapped with a transmission period, wherein the third threshold is configured according to a sum of the transmission period and a tolerance.

10. A communication system, comprising:
    a first electronic device, comprising:
      a wireless transmitter configured to send a wireless signal, the wireless signal comprises a series of periodic pulses;
    a second electronic device, comprising:
      a wireless receiver configured to receive a first pulse of the wireless signal and a second pulse of the wireless signal after the first pulse; and
      a processor configured to:
        determine a first status of the second electronic device in response to the first pulse being received, the first status is selected from one of a clear flag status, a set flag status and a keep flag status;
        measure a received time gap between the first pulse being received and the second pulse being received in response to the second pulse being received;
        determine a new status of the second electronic device according to the received time gap and the first status of the second electronic device, wherein the new status is selected from one of the clear flag status, the set flag status and the keep flag status; and determine whether to synchronize a system clock on the second electronic device with the second pulse of the wireless signal according to the new status.

11. The communication system of claim 10, wherein the second electronic device is determined to synchronize the system clock with the second pulse in response to that the new status is determined to be the clear flag status, and the second electronic device is determined to not synchronize the system clock with the second pulse in response to that the new status is determined to be the set flag status or the keep flag status.

12. The communication system of claim 11, wherein under a condition that the first status is in the clear flag status, the processor further configured to:
compare the received time gap with a first threshold;
in response to the received time gap exceeds the first threshold, determine the new status as the set flag status; and
in response to the received time gap is shorter or equal to the first threshold, determine the new status as the clear flag status.

13. The communication system of claim 12, wherein the first electronic device sends the series of periodic pulses to the second electronic device, each adjacent two of the periodic pulses are gapped with a transmission period, and the first threshold is determined according to a sum of the transmission period and a tolerance.

14. The communication system of claim 11, wherein under a condition that the first status is in the clear flag status, the processor further configured to:
compare the received time gap with a second threshold;
in response to the received time gap exceeds or is equal to the second threshold, determine the new status as the set flag status; and
in response to the received time gap is shorter than the second threshold, determine the new status as the keep flag status.

15. The communication system of claim 14, wherein the first electronic device sends the series of periodic pulses to the second electronic device, each adjacent two of the periodic pulses are gapped with a transmission period, and the second threshold is determined according to the transmission period deducting a deduction value, wherein the deduction value is determined according to a tolerance or a delay time length.

16. The communication system of claim 15, wherein the delay time length is measured according to a difference between the received g time gap and the transmission period under a condition that the first status is in the clear flag status and the new status is determined as the set flag status.

17. The communication system of claim 11, wherein under a condition that the first status is in the keep flag status, the processor further configured to:
compare the received time gap with a third threshold;
in response to the received time gap exceeds the third threshold, determine the new status as the set flag status; and
in response to the received time gap is shorter or equal to the third threshold, determine the new status as the clear flag status.

18. The communication system of claim 17, wherein the first electronic device sends the series of periodic pulses to the second electronic device, each adjacent two of the periodic pulses are gapped with a transmission period, the third threshold is determined according to a sum of the transmission period and a tolerance.

* * * * *